United States Patent [19]
Uhtenwoldt

[11] 3,828,481
[45] Aug. 13, 1974

[54] CAM CONTROLLED MACHINE FOR GRINDING A NON-CIRCULAR SURFACE
[75] Inventor: Herbert Rudolf Uhtenwoldt, Worcester, Mass.
[73] Assignee: Cincinnati Milacron-Heald Corp., Worcester, England
[22] Filed: May 23, 1973
[21] Appl. No.: 362,957

[52] U.S. Cl......... 51/101 R, 51/50 PC, 51/DIG. 32, 90/13 B
[51] Int. Cl........................... B24b 7/04, B24b 17/00
[58] Field of Search ......... 51/50 PC, 100, 101, 127, 51/165.79, 165.89, DIG. 32; 408/54; 90/13 B, 13.4

[56] References Cited
UNITED STATES PATENTS

| 2,844,074 | 7/1958 | Meyer | 51/101 D X |
| 3,663,188 | 5/1972 | Hoglund | 51/101 R |
| 3,750,345 | 8/1973 | Kolesar | 51/101 R X |

Primary Examiner—Al Lawrence Smith
Assistant Examiner—Nicholas P. Godici
Attorney, Agent, or Firm—Norman S. Blodgett; Gerry A. Blodgett

[57] ABSTRACT

A grinding machine for forming a non-circular surface on a workpiece, the machine having means for preventing misformation of the surface due to lack of normalcy between a master cam and its cam follower.

10 Claims, 10 Drawing Figures

CAM CONTROLLED MACHINE FOR GRINDING A NON-CIRCULAR SURFACE

BACKGROUND OF THE INVENTION

In the design and manufacture of machines for forming non-circular surfaces by use of the abrasive machining process, a master cam is commonly used to guide the relative motion between the workpiece and the grinding wheel. It does so in such a manner as to duplicate the master cam surface on the workpiece. In order to obtain accuracy in this operation, it is desirable that a situation known as "normalcy" be maintained. This is defined as moving the master cam past the cam follower in such a way that the point of contact between the cam follower and the master cam surface lie in the same plane at all times. The result of maintaining this geometry is that the force between the workpiece and the grinding wheel remains in the same direction during the entire cycle of rotation of the master cam, so that the grinding wheel always cuts on the same line, namely, that line where it is dressed and runs true. Long experience with grinding spindles has shown that the grinding wheel runs true only in the line where it has been dressed. The process of maintaining normalcy also allows wheel wear without distortion of the shape of the workpiece due to another type of error.

The condition of normalcy is particularly useful in grinding the housing of the so-called "Wankel" engine which has a figure-eight chamber element with an epitrochoid form. In such a shape there are some areas of the surface which have a high rate of irregular change both inwardly and outwardly of a basic circle. Various ways of accomplishing the formation of such surfaces have issued in the past, particularly in such patents as the Davies U.S. Pat. No. 2,421,548; the Appleton U.S. Pat. No. 3,259,021; and the Hoglund U.S. Pat. No. 3,663,188. All of these constructions have the handicap that the driving of the master cam takes place through frictional contact with a roll. The wearing of the frictional roll causes inaccuracy in the grinding operation. The grinding force is limited by the friction available. Also, to maintain the normal tolerance, it has been necessary to operate such machines at a very low speed with small amounts of metal removal. Since the machines are very expensive, the use of a long grinding cycle is economically non-feasible. The prior art devices are simply not capable of transmitting sufficient horsepower to the rotation and movement of the cam and of the workpiece to produce high production operation. It has been suggested in the patent application of Uhtenwoldt, Ser. No. 309,201 filed Nov. 24, 1972, that the master cam be used only for approximating the shape of the finished surface and that a secondary cam be used for producing additional angular rotation of the workpiece about the point of contact between the workpiece and the grinding wheel to produce true normalcy. While this feature gives good results, another problem exists of maintaining the pressure between the cam follower and the cam at a constant value. These and other problems presented by the prior art have been obviated in a novel manner by the present invention.

It is, therefore, an outstanding object of the invention to provide a grinding machine for generating a non-circular surface on a workpiece, including means for maintaining exact normalcy and having available large amounts of power.

Another object of this invention is the provision of a cam grinder in which the rolls which are subject to contact with the master cam surface are not subject to wear because of introduction of power through them.

A further object of the present invention is the provision of a cam grinder in which no frictional driving action takes place against the master cam surface.

It is another object of the instant invention to provide a grinding machine for grinding cam-like workpieces in which the main drive of the workpiece and the master cam takes place through conventional gearing and in which additional motion is provided to maintain precise normalcy.

A still further object of the invention is the provision of a cam grinder which is capable of a high precision and heavy industrial production operation with a minimum of wear on the parts and which requires a minimum of maintenance and replacement of parts.

It is a further object of the invention to provide a grinding machine for producing cam-like articles which is capable of heavy-duty industrial production usage with relatively non-skilled labor.

It is a still further object of the present invention to provide a cam grinder in which normalcy is produced by a direct drive rather than a friction drive, so that little wear or slippage takes place and in which the pressure between the cam follower and the master cam is maintained at a predetermined value.

It is a still further object of the invention to provide a cam grinder whose driving power is presented through smooth-acting worm gearing having the least number of contacts; the presence of a single worm driving two worm gears means that the driving force is divided into two oppositely-directed forces.

SUMMARY OF THE INVENTION

In general, the invention consists of a grinding machine for forming a non-circular surface on a workpiece having a base with a plane surface and having a table mounted on the said surface of the base for slidable movement in any direction in that plane. A workhead is rotatably located in the table for supporting and rotating the workpiece and a master cam is mounted on the workhead and has a surface representative of the surface to be formed. A wheelhead is mounted on the base for operative movement relative to the workhead and has an abrasive wheel or other tool for generating the said surface. A cam follower is provided for engaging the surface of the master cam and is rigidly connected to the base. A spring is associated with the cam follower to press it against the surface of the master cam and a preload cam is provided to change the tension in the spring while the workhead rotates and moves in and out to cause the force between the cam follower and the master cam to remain essentially constant.

More specifically, the base is provided with a pivot shaft that extends into the table and provides for the rotation of the table about an axis which passes through the point of contact of the cam follower with the master cam. The shaft is provided with a bore in which the spring is mounted, and the spring is a rod having at one end a roller for engaging the preload cam and mounted at the other end in a block which is pivotally mounted in the bore in the shaft, there being a screw means provided for adjusting aspect angle which in turn adjusts the preload of cam roller against the preload cam.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
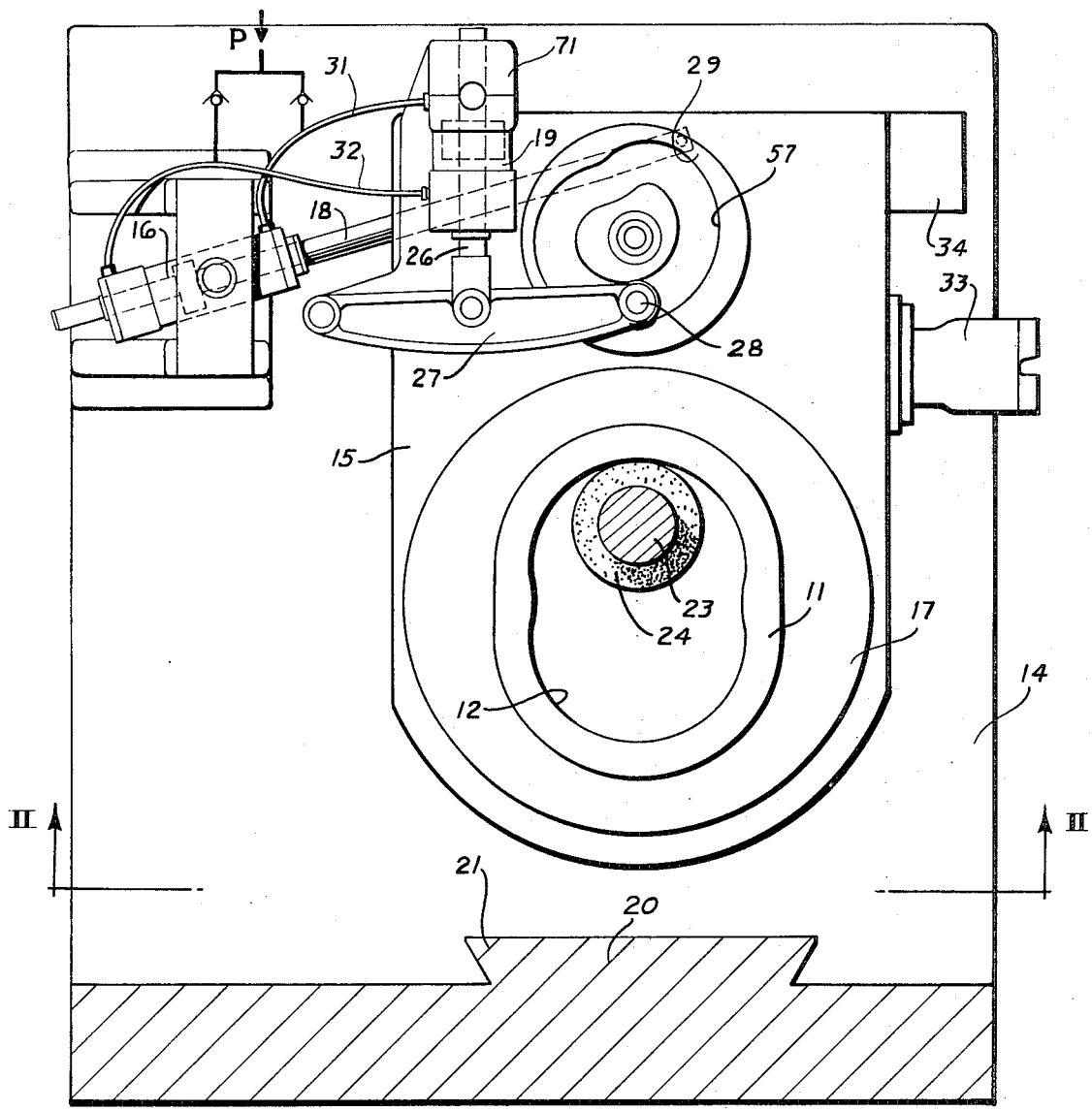
FIG. 1 is a horizontal sectional view of a grinding machine embodying the principles of the present invention, taken on the line I—I of FIG. 3.
Figure 2:
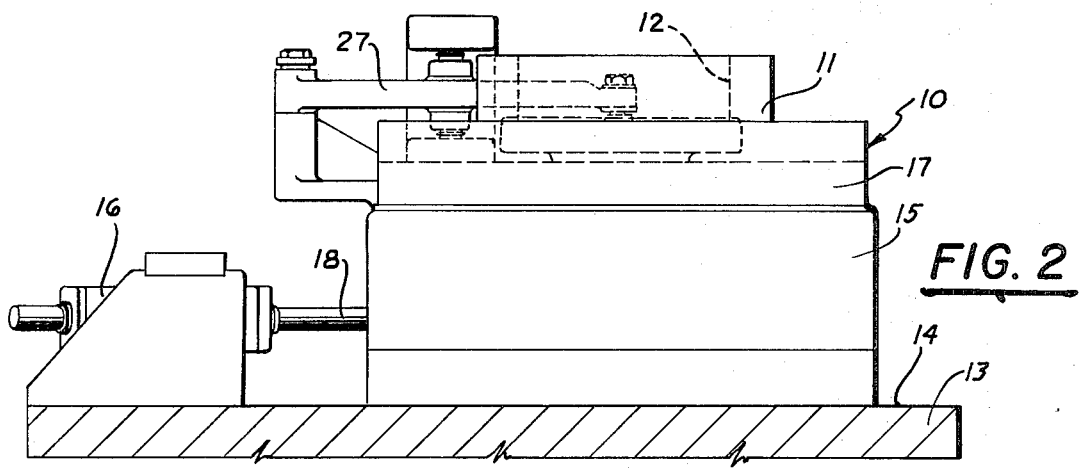
FIG. 2 is a vertical sectional view of the machine taken on the line II—II of FIG. 1.
Figure 3:
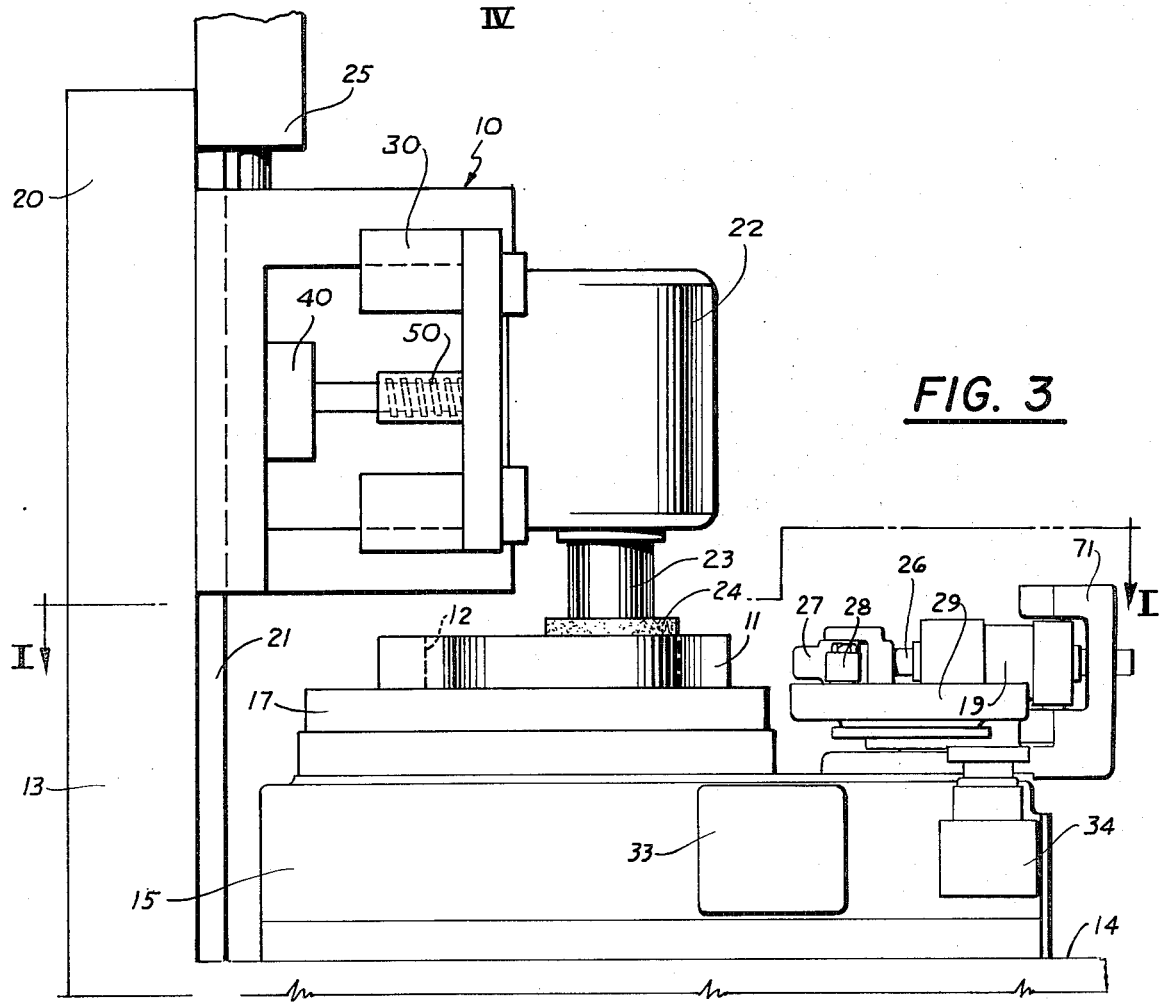
FIG. 3 is a front elevational view of the machine.

Referring first to FIG. 1, wherein are best shown the general features of the invention, the grinding machine, indicated generally by the reference numeral 10, is shown as supporting a workpiece 11 on which a noncircular surface 12 is to be formed. In the illustration, the workpiece is shown as the stator of a Wankel engine in which the surface 12 is an epitrochoid. The machine is provided with a base 13, having a plane upper horizontal surface 14 on which is mounted a table 15 for sliding movement in any direction. A wheelhead 22 (FIG. 3) is mounted on a vertical column 20 extending upwardly from the base. The wheelhead is provided with a spindle 23 on the lower end of which is mounted an abrasive wheel 24. A suitable guide 21 and the column 20 provides for vertical sliding motion of the wheelhead 22 and a cylinder 25 is provided for that purpose. A cross-slide 30 is provided for feeding the wheel 24 into the work by means of a stepping motor 40 and a ball screw 50. A workhead 17 is mounted in the table 15 to hold and rotate the workpiece 11. Generally speaking, movement parallel to the axis of the abrasive wheel 24 takes place by movement of the wheelhead 22 vertically, while feeding movements transversely of the axis take place by movement of the slide 30 under the impetus of the motor 40, as will be explained more fully hereinafter. A master cylinder 16 has its housing pivotally mounted on the top of the base 13 and has a piston rod 18 extending into the table 15. A hydraulic slave cylinder 19 is mounted on the top of the table 15 and has its actuating rod 26 connected to the center of a connecting arm 27 which is pivoted at one end to the table 15 and at the other end is connected to a suitable cam roller 28 engaging a cam 29. The slave cylinder 19 is connected to the master cylinder 16 by hydraulic lines 31 and 32. A hydraulic motor 33 is attached to the side of the table 15 controlled by rate valve 34.

Figure 5:
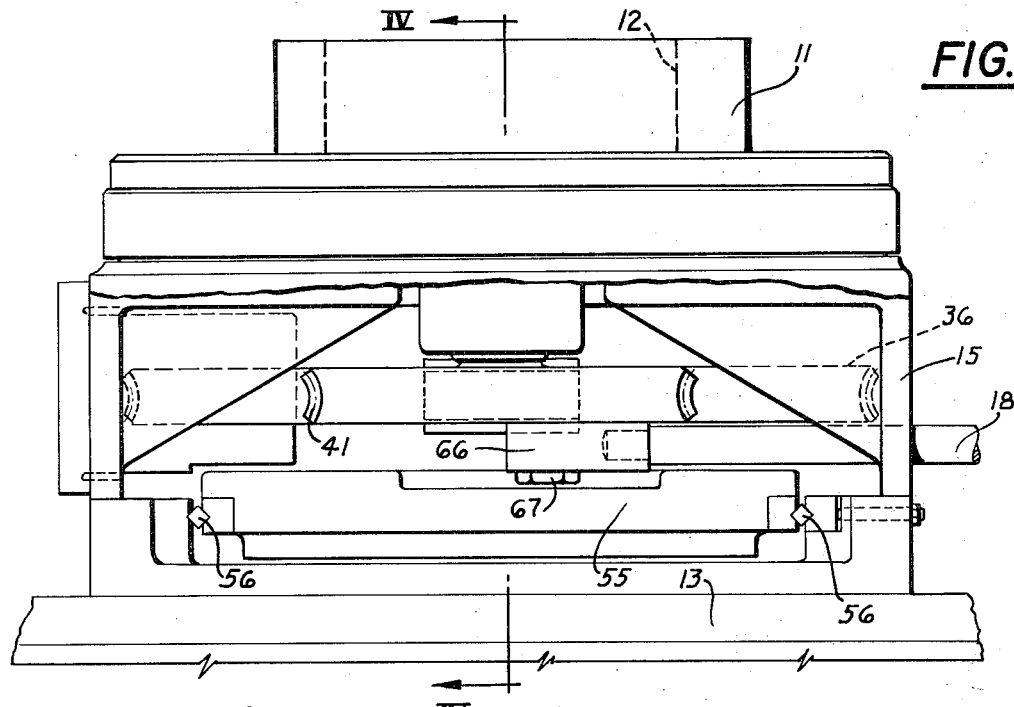
FIG. 5 is an end elevational view of the invention taken on the line V—V of FIG. 4.
Figures 4, 6:
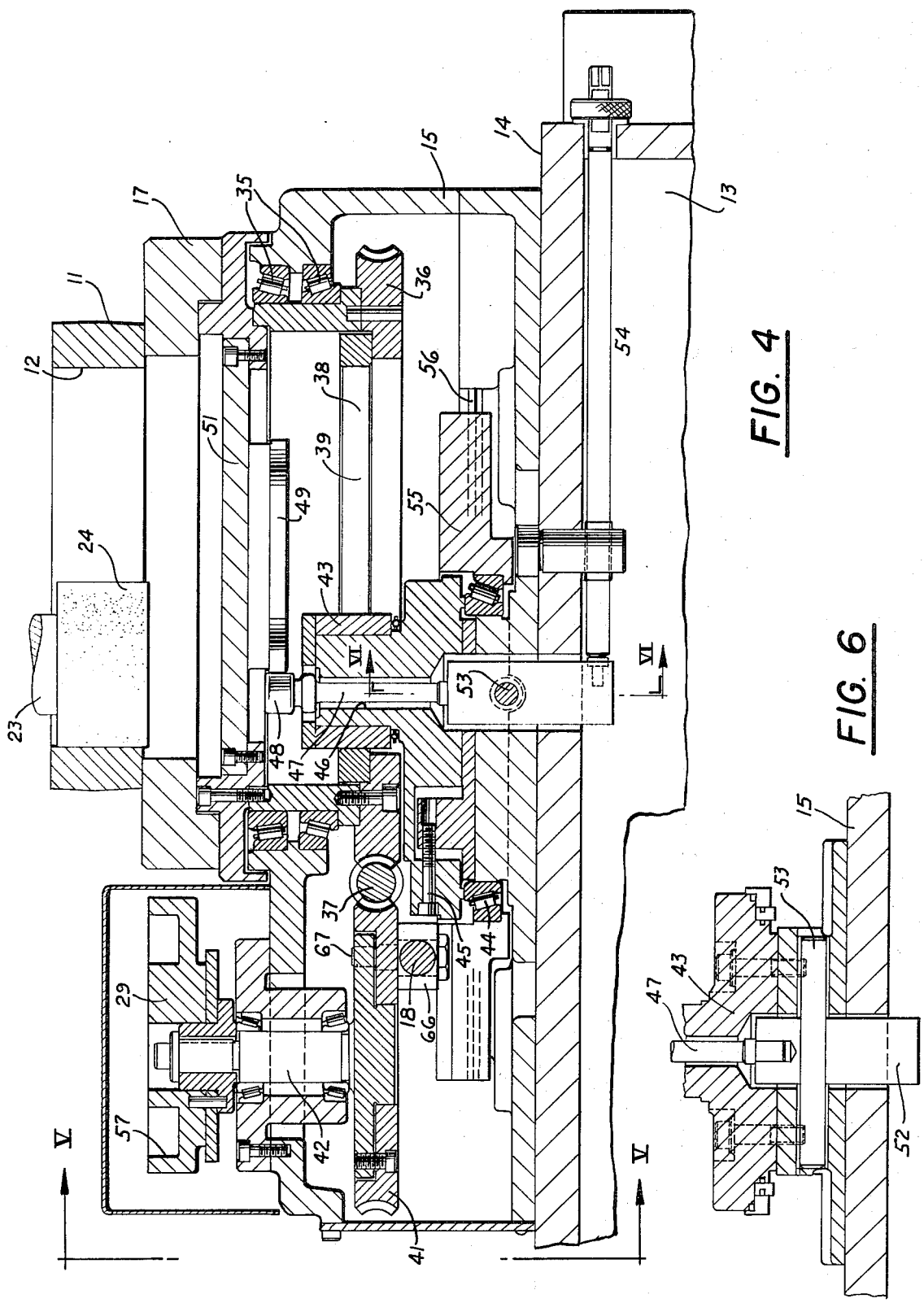
FIG. 4 is a sectional view of the machine taken on the line IV—IV of FIG. 5.
FIG. 6 is an enlarged vertical sectional view of a portion of a machine taken on the line VI—VI of FIG. 4.

Referring now to FIGS. 4 and 5, it can be seen that the workhead 17 is rotatably mounted in a set of tapered roller bearings 35 and has attached to its lower end, an annular worm gear 36. This gear is engaged with a worm 37 which is driven by the main motor 33. However, on top of the gear is located a master cam 38 having a surface 39 which is an equivalent of the final surface 12 to be finished on the workpiece 11. The worm 37 also engages a smaller worm gear 41 whose diameter is exactly one-half that of the worm gear 36. This last worm gear is mounted on a lower end of a vertical shaft 42 rotatably supported in the table 15. The upper end carries the cam 29 which has been described previously. The surface 39 of the master cam 38 is contacted by a cam follower 43, which consists of a rotatable sleeve hydrostatically journaled on a stub shaft. The axis of rotation of a roller bearing 44 and pivot slide 55 is a vertical line which passes through the point of contact of the cam follower 43 with the surface 39 of the master cam. The stub shaft is mounted with an adjusting screw 45 which connects two parts of the stub shaft in such a way that the line of contact of the cam follower and cam 39 can be adjusted relative to the axis of the bearing 44. The stub shaft is provided with a vertical bore 46 in which is located a spring 47 in the form of a rod. The upper end of the rod carries a smaller cam follower 48 which engages a secondary cam 49 which is fixed to and extends downwardly from a plate 51 forming part of the workhead 17 and rotating with it.

The cantilever spring 47 extends downwardly and is fixed to a block 52, which resides in a large recess formed in the bottom of the cam follower stub shaft and in the lower part of the plate 15. It is connected to the plate 15. For adjusting preload of spring 47 the horizontal shaft 53 and its lower end is adjusted for its angular aspect by means of an adjusting screw 54 mounted on the bottom of the plate 15.

It should be pointed out that the bearing 44 is carrying table 55, which is slidable in way 56. This means that the follower 43 is fixed relative to the base and that the table 55 and the bearing 44 are capable of pivoting back and forth in about a vertical axis. The arrangement for this motion of the table 55 and the cam follower 43 is best shown in FIG. 5. FIG. 6 shows the details of the manner in which the block 52 is mounted on the shaft 53 for adjustment preload force of the spring 47 in a plane perpendicular to the axis of the shaft 53.

Figure 7:
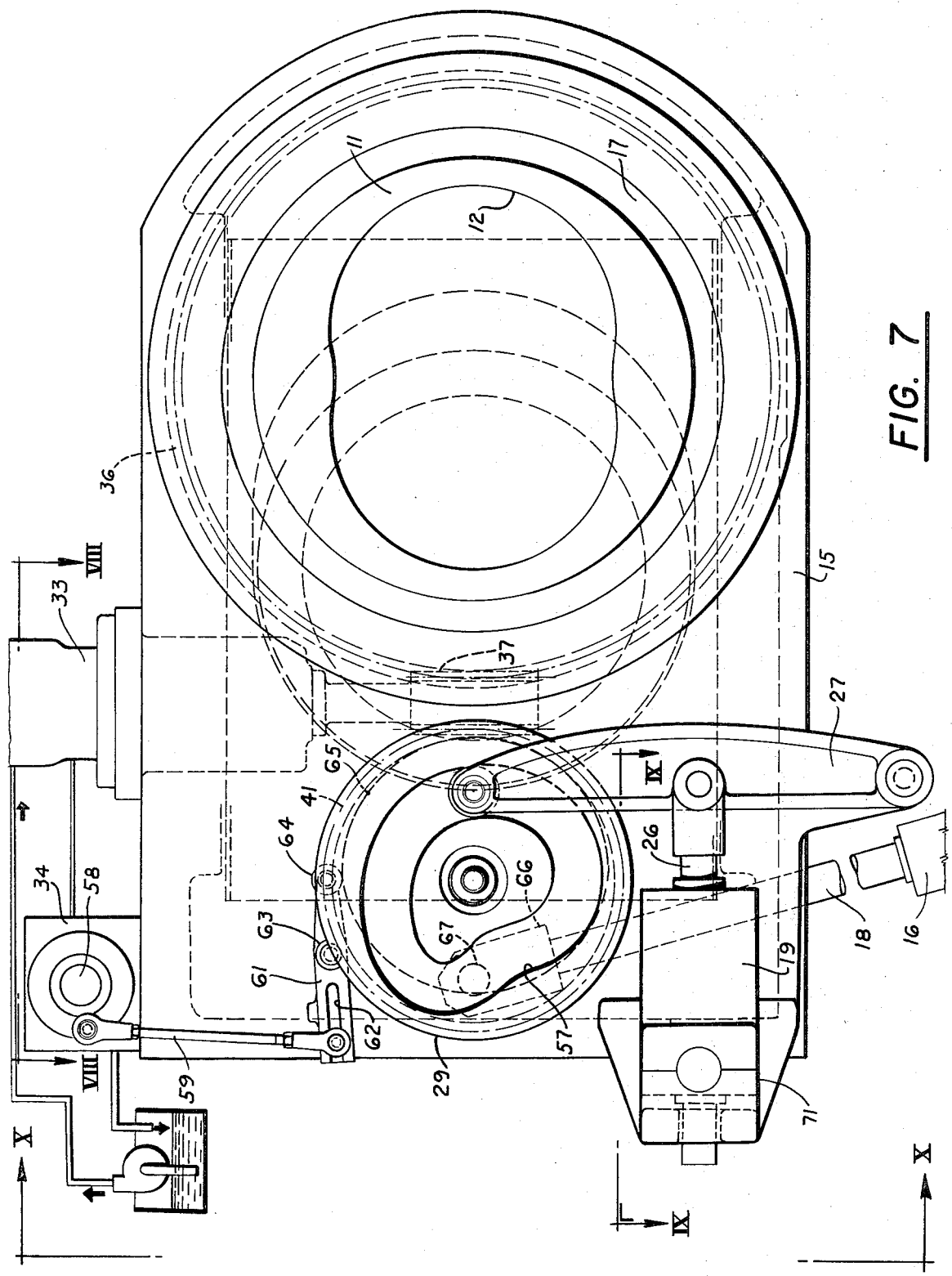
FIG. 7 is a plan view of a portion of the machine shown in FIG. 4.

FIG. 7 shows further details of the construction of the table 15. It shows the manner in which the main motor 33 has its output shaft and the worm 37 lying between the large worm gear 36 and the small worm gear 41. It also illustrates that the cam 29 has a configured internal cam track 57 in which the cam follower 28 rides. The upper end of rate valve 34 is provided with an eccentric 58 joined by a connecting rod 59 to an arm 61 having a slot 62 which allows the point of attachment of the connecting rod 59 to the arm 61 to be adjusted. The arm 61 is pivotally mounted in its central portion on a pivot pin 63 to the table 15 proper and has a cam roller 64 at its free end. This roller engages a cam surface 65 fastened to the underside of the cam 29 (see FIG. 10). This cam modulates the opening and closing of the rate valve 34 to obtain essentially constant surface velocity on an irregular work surface. Note that the inner end of the piston rod 18 is connected to a block 66 which is pivotally connected to the gear 41 by a pin 67 (this also can be seen in FIGS. 4 and 5).

Figure 8:
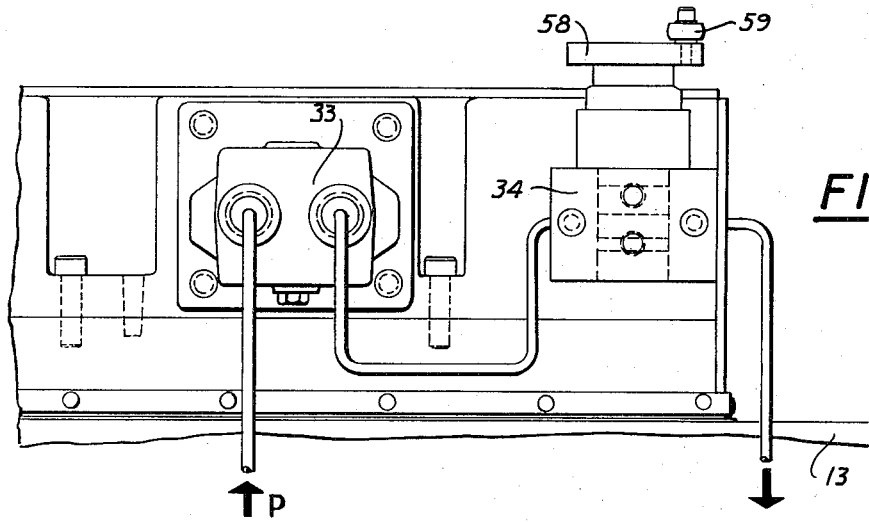
FIG. 8 is an elevational view of a portion of the machine as viewed along the line VIII—VIII of FIG. 7.

FIG. 8 shows the general arrangement of the main motor 33 and the secondary motor 34. These are hydraulic motors and suitable hydraulic ports are provided for the flow of fluid.

Figure 9:
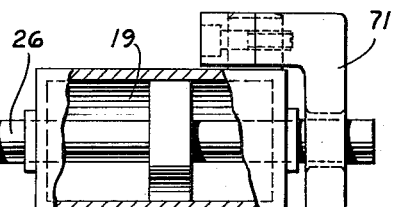
FIG. 9 is an elevational view of a portion of the machine taken on the line IX—IX of FIG. 7.

FIG. 9 shows the details of the manner in which the compensating cylinder 19 is mounted on the top of the table 15 by means of a bracket 71 with suitable adjustments provided.

Figure 10:
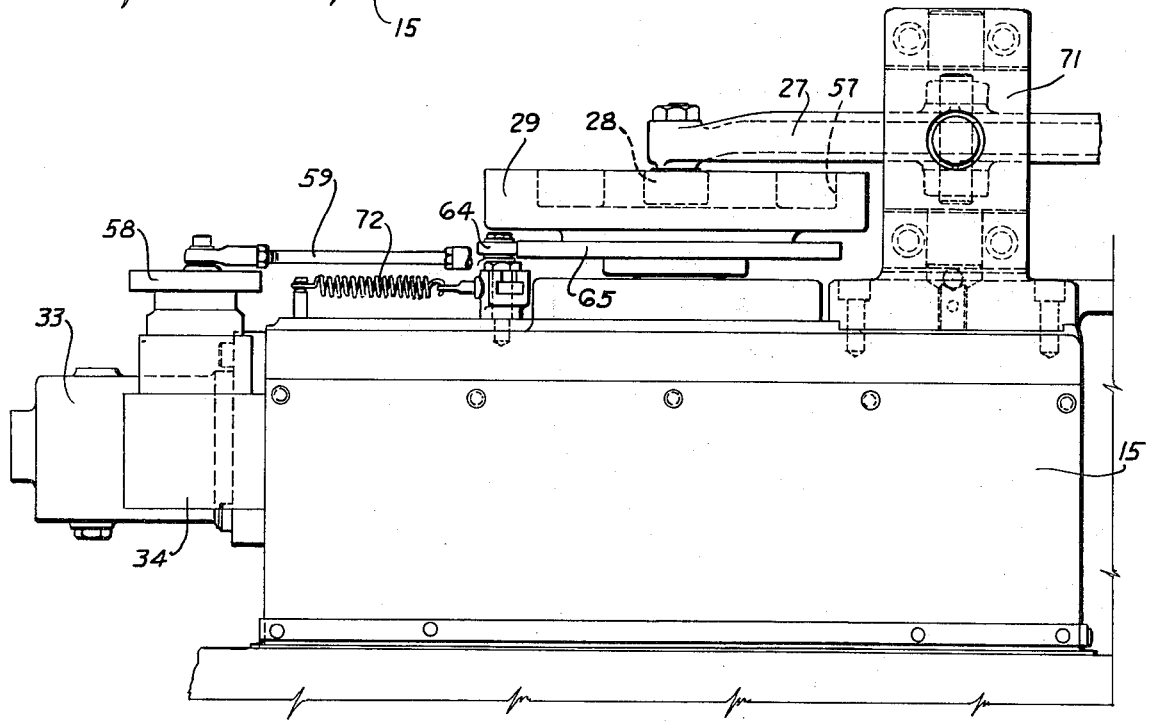
FIG. 10 is an end elevational view of the machine as viewed along the line X—X of FIG. 7.

FIG. 10 shows particularly well the arrangement of the parts. It shows the presence of a coil spring 72 connected to the arm 62 to bias the cam follower 64 against the cylindrical surface 65.

The operation of the invention will now be readily understood in view of the above description. With the grinding machine entirely energized, the wheelhead 22 rotates the spindle 23 and the abrasive wheel 24, so that material is ground from the inner surface of the workpiece 11 to form the finished surface 12. At the same time, the motor 33 is operated to motivate the table mechanisms in the table 15. The motor 33 drives the worm 37 which, in turn, rotates the worm gear 36 and rotates the workhead 17 about the axis defined by the bearing 35. The cam 49 operating on the cam follower 48 presses against the spring 47 and the reaction of this is to press the cam follower 43 against the surface 39 of the main cam 38. Now the cam follower 43 is locked to the base 13 through plate 14. The adjusting screw 54 which engages the bottom of the block 52, so that, as the surface 39 of the cam changes shape, it causes the entire table 15 to move in a longitudinal direction, i.e., the plane joining the axis of bearing 35 and the shaft 42. At the same time, a mechanism is provided to swing the entire table angularly about the line defined by the engagement of the cam follower 43 and the surface 39. First of all, the worm 37 operates on the small worm gear 41 to rotate the shaft 42 and therefore, the compensation cam 29. The rotation of the cam 29 operates through the cam follower 28 and the crank arm 27 to operate the actuating shaft 26 associated with the rate cylinder 19, so that it draws and withdraws hydraulic fluid through the lines 31 and 32 associated with the cylinder 16, and the piston rod 18 of that cylinder moves back and forth. The rod 18 operates through the block 66 and the pin 67 to add or subtract a distance between the center of the shaft 42 and the portion of the base 13 to which the cylinder 16 is attached. This has the effect of swinging the table 15 and the axis that is available for this swinging is defined by the bearing 44, whose center (it will be recalled) is a vertical line passing through the line of contact between the cam follower 43 and the surface 39 of the main cam 38. At the same time cam 65 through the medium of the rate valve 34, its eccentric 58, the connecting rod 59 and the arm 61 operating the cam follower 64 changes the rate of motor 33 to obtain constant work surface velocity. The main swinging motion of 15 is provided by crank pin 67 as worm wheel 41 rotates twice per revolution of work piece, so that it is only necessary for the cam 29 to add and subtract small increments of motion from this main swinging action.

The crank 67 provides approximate normalcy within 4°. The compensation through cam 29, master cylinder, and follower provides accurate normalcy, so that it is only necessary to provide a secondary cam 29 of the proper shape to make the final adjustments for very accurate normalcy. It can be seen that this construction is a very simple one, is capable of a wide range of uses and that it will operate effectively for long periods of time with a minimum of maintenance. Once the cam 29 has been selected and locked in place, there is very little for the operator to do except make sure that the machine is operating properly. Conventional internal grinding machines can be converted to this particular purpose with little difficulty.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine for forming a non-circular surface on a workpiece, comprising
   a. a base having a plane surface,
   b. a table mounted on the said surface of the base for sliding movement in any direction in that plane,
   c. a workhead rotatably located in the table for supporting and rotating the workpiece,
   d. a master cam mounted on the workhead and having a surface representative of the said surface to be formed,
   e. a wheelhead mounted on the base for operative movement relative to the workhead and having an abrasive wheel for generating the said surface,
   f. a cam follower for engaging the said surface of the master cam,
   g. means joining the cam follower to the base to cause the workpiece to move in the approximate path of the said surface of the master cam, and
   h. a spring associated with the cam follower to press it against the surface of the master cam, and
   i. a secondary cam to change the spring deflection as the work-head rotates to cause the force between the cam follower and the master cam to remain constant during the rotation of the workhead.

2. A grinding machine as recited in claim 1, wherein a link joins the base to the table to correct variation in normalcy during the rotation of the workhead, wherein the workhead is provided with a gear concentric with an axis through the center of rotation thereof, and wherein the table is provided with a motor driving a worm which in turn drives the workhead gear.

3. A grinding machine as recited in claim 2, wherein the link is attached to the table at a point spaced from the line of contact of the cam follower and the master cam.

4. A grinding machine as recited in claim 3, wherein the length of the link is adjustable by virtue of an extensible hydraulic cylinder controlled by a master cylinder operated by a compensation cam.

5. A grinding machine as recited in claim 4, wherein a tertiary cam driven by the worm gear operates a hydraulic cylinder which is connected by hydraulic lines to operate the cylinder in the link.

6. A grinding machine as recited in claim 1, wherein the base is provided with a pivot shaft that extends into the table and provides for the rotation of the table about an axis passing through the point of contact of the cam follower with the master cam, and wherein the shaft is provided with a bore in which the spring is mounted.

7. A grinding machine as recited in claim 6, wherein the spring is a rod having at one end a roller for engaging the secondary cam and being mounted at the other end in a block which is pivotally mounted in the bore in the shaft, and wherein screw means is provided for locking the block at a selected aspect angle in the bore.

8. A grinding machine as recited in claim 7, wherein the rod extends through the cam follower and the cam follower is rotatably mounted on the intermediate portion of the rod.

9. A grinding machine as recited in claim 1, wherein means is provided for obtaining constant work surface velocity.

10. A grinding machine as recited in claim 2, wherein the worm not only drives a workhead worm gear but also a compensation cam worm gear, the single worm and double worm gears being arranged to balance their reaction forces.

* * * * *